UNITED STATES PATENT OFFICE.

CHARLES P. CARTWRIGHT, OF GEORGETOWN, WASHINGTON.

POULTRY HEALTH FOOD.

No. 826,990.　　　　Specification of Letters Patent.　　　　Patented July 24, 1906.

Application filed December 15, 1905. Serial No. 291,931.

*To all whom it may concern:*

Be it known that I, CHARLES P. CARTWRIGHT, a citizen of the United States, residing at Georgetown, in the county of King and State of Washington, have invented certain new and useful Improvements in Poultry Health Food; and I do hereby declare the following to be a full, clear, and exact description of the invention, such as will enable others skilled in the art to which it appertains to make and use the same.

This invention relates to improvements in foods, and particularly to a poultry-food.

The object of the invention is the production of a food which will keep the poultry in a vigorous healthy condition and promote the laying of eggs.

With this and other objects in view the invention consists in combining certain substances for producing a food, as will be hereinafter fully described, and more particularly pointed out in the claims hereto appended.

My improved poultry-food comprises certain substances mixed in a dry state for producing a dry composition or powder.

While the proportions hereinafter given are designed to make one pound of sixteen ounces of the food, any larger amount can be made with corresponding ratios. The ingredients or substances comprising one pound of the food are as follows: blood meal, which is dried pulverized blood, three ounces; ground or pulverized flaxseed-meal, preferably with oil extracted, two ounces; common wheat-bran, two ounces; common salt, one ounce; ground or pulverized red pepper, one ounce; ground or pulverized ginger-root, one ounce; ground or pulverized oyster-shells, two and one-half ounces; Venetian red, one and seven-sixteenths ounces; black antimony, one-sixteenth ounce; copperas, one ounce; pulverized sulfur, one ounce. After these ingredients have been thoroughly mixed any desired quantity of the compound may be moistened and mixed with the regular food which is to be given to the poultry—as, for instance, grain or mash. The amount of the compound which is ordinarily fed to a dozen hens is one teaspoonful. This amount of the compound is preferably given to the poultry every day, if necessary; but it may be given on alternate days or more seldom, as may seem best.

The compound will keep poultry in a vigorous healthy condition, which will insure the hens laying well. This compound will prevent common poultry diseases—as, for instance, cholera. It will also make the poultry lively and bright, as well as keeping their feathers smooth and glossy.

What I claim is—

1. A poultry-powder comprising blood meal, pulverized flaxseed-meal, common wheat-bran, common salt, pulverized red pepper, pulverized ginger-root, pulverized oyster-shells, Venetian red, black antimony, copperas, and pulverized sulfur in substantially the proportions specified.

2. A poultry-powder, comprising the following ingredients in substantially the proportions given, namely forty-eight parts blood meal, thirty-two parts flaxseed-meal, thirty-two parts common wheat-bran, sixteen parts common salt, sixteen parts pulverized red pepper, sixteen parts pulverized ginger-root, forty parts pulverized oyster-shells, twenty-three parts Venetian red, one part black antimony, sixteen parts copperas, and sixteen parts pulverized sulfur combined and intermingled in a dry state.

In testimony whereof I affix my signature in presence of two witnesses.

CHARLES P. CARTWRIGHT.

Witnesses:
　G. WARD KEMP,
　C. C. PHILLIPS.